(12) United States Patent
Bloor

(10) Patent No.: US 11,770,083 B2
(45) Date of Patent: Sep. 26, 2023

(54) ELECTRIC MACHINE CONTROL

(71) Applicant: SAFRAN ELECTRICAL & POWER, Blagnac (FR)

(72) Inventor: Andrew Bloor, Buckinghamshire (GB)

(73) Assignee: SAFRAN ELECTRICAL & POWER, Blagnac (FR)

( * ) Notice: Subject to any disclaimer, the term of this patent is extended or adjusted under 35 U.S.C. 154(b) by 271 days.

(21) Appl. No.: 17/285,962

(22) PCT Filed: Oct. 22, 2019

(86) PCT No.: PCT/EP2019/078763
§ 371 (c)(1),
(2) Date: Apr. 16, 2021

(87) PCT Pub. No.: WO2020/083937
PCT Pub. Date: Apr. 30, 2020

(65) Prior Publication Data
US 2021/0344274 A1    Nov. 4, 2021

(30) Foreign Application Priority Data

Oct. 25, 2018  (GB) ..................................... 1817364

(51) Int. Cl.
*H02P 9/30*     (2006.01)
*H02M 7/48*    (2007.01)
(Continued)

(52) U.S. Cl.
CPC ............. *H02P 9/302* (2013.01); *H01F 38/18* (2013.01); *H02M 3/01* (2021.05);
(Continued)

(58) Field of Classification Search
CPC ... H01F 38/18; H02P 9/08; H02P 9/42; H02P 27/085; H02P 2101/30; H02P 9/30; H02M 3/33573
See application file for complete search history.

(56) References Cited

U.S. PATENT DOCUMENTS 5,029,263 A  *  7/1991  Rozman .................. F02N 11/04
                                                                     318/438
2006/0267523 A1    11/2006  Seelig et al.
(Continued)

FOREIGN PATENT DOCUMENTS

| EP | 2286727 A1 | 2/2011 |
| EP | 2530805 A1 | 12/2012 |
| EP | 2840702 A2 | 2/2015 |
| GB | 2443032 A | 4/2008 |

OTHER PUBLICATIONS

Great Britain Search Report, Application No. GB1817364.1 dated Apr. 16, 2019, 3 pages.
(Continued)

*Primary Examiner* — Cortez M Cook
(74) *Attorney, Agent, or Firm* — Rankin, Hill & Clark LLP

(57) ABSTRACT

Controlling a DC-AC inverter of an electric machine, where the electric machine comprises a resonant main exciter having rotary transformer. A voltage level of DC power received at a DC-AC inverter is monitored and the frequency of AC power generated by the DC-AC inverter and supplied to the rotary transformer is controlled based at least in part on the voltage level of the DC power.

16 Claims, 7 Drawing Sheets

(51) Int. Cl.
*H01F 38/18* (2006.01)
*H02P 27/08* (2006.01)
*H02M 3/00* (2006.01)
*H02M 3/335* (2006.01)
*H02P 9/08* (2006.01)
*H02P 9/42* (2006.01)
*H02P 101/30* (2015.01)

(52) U.S. Cl.
CPC ..... *H02M 3/33573* (2021.05); *H02M 7/4818* (2021.05); *H02P 9/08* (2013.01); *H02P 9/42* (2013.01); *H02P 27/085* (2013.01); *H02P 2101/30* (2015.01)

(56) References Cited

U.S. PATENT DOCUMENTS

| | | | |
|---|---|---|---|
| 2011/0261931 A1 | 10/2011 | Zimpfer et al. | |
| 2014/0265744 A1* | 9/2014 | Rozman | H02P 9/30 310/68 D |
| 2015/0333679 A1 | 11/2015 | Box | |

OTHER PUBLICATIONS

International Search Report and Written Opinion, PCT/EP2019/078763, dated Feb. 14, 2020, 15 pages.

Veitengruber, et al. "Preliminary Investigations of an Inductive Power Transfer System for the Rotor Power Supply of an Electric Traction Drive", 2014 Ninth International Conference on Ecological Vehicles and Renewable Energies, Mar. 25, 2014, 8 pages.

\* cited by examiner

ELECTRIC MACHINE CONTROL

TECHNICAL FIELD

The present disclosure relates to the control of a DC-AC inverter of an electric machine.

BACKGROUND

Aircraft electrical systems typically comprise one or more electric machine operating as generators (also referred to as alternators) which output generated power to a point of regulation (POR). The aircraft electrical systems also comprise one or more items of utilisation equipment (for example, pumps, aircraft control systems, batteries and battery management systems), which are coupled to, and receive electrical power from, the POR. The electric generators may typically be driven by the aircraft propulsion engines, such as jet engines, and normally output AC power at about 400 Hz or at a variable frequency, depending on the generator configuration and the requirements of equipment utilising the generated power.

FIG. 1 shows an example schematic of a conventional wound field synchronous electric machine 100 comprising three stages. The first stage is a permanent magnet generator 110, which provides electrical power to the main exciter DC drive 144 when the only source of power is the mechanical rotation of the rotor. Rotation of the rotor causes the permanent magnet 112 to rotate and induce current in the stator 114. The induced current is supplied to the Main Exciter DC Power Supply Unit (PSU) 116. The main exciter DC drive 144 provides excitation power, normally DC, to the stator 122 of the second stage—the main exciter 120. Excitation power supplied to the stator 122 causes a current to be induced in the rotating exciter rotor windings 124. The induced current in the exciter rotor windings 124 in turn induces a current in the stator 132 of the third stage—the main generator 130. The output of the main generator 130 is supplied to the POR 150. There is an apparent power gain, approximately ten fold, from each stage to the next which is made up from the mechanical shaft input power.

The excitation current supplied to the stator 122 of the main exciter 120 regulates the output of the main generator 130. Therefore, feedback can be taken from the POR 150 to the excitation control unit 146, in order to control the excitation power supplied to the stator 122, thereby controlling the output of the main generator 130.

In the future, it may be desirable to use electric machines in aircraft electrical systems not just as generators, but also as starter motors for the aircraft engine. However, in the conventional wound field synchronous electric machine 100, this would require the main generator 130, being used as a motor, to be fully excited when the rotor speed is zero. The conventional wound field synchronous electric machine 100 is not capable of this. Therefore, an alternative design and operation of electric machine is desired to enable it to be used as both a starter motor and generator in an aircraft electrical system.

SUMMARY

In a first aspect of the present disclosure, there is provided a method of controlling a DC-AC inverter of an electric machine, wherein the electric machine comprises a resonant main exciter having rotary transformer, the method comprising: monitoring a voltage level of DC power received at a DC-AC inverter; and controlling a characteristic of AC power generated by the DC-AC inverter and supplied to the rotary transformer, wherein controlling the characteristic of the AC power is based at least in part on the voltage level of the DC power, wherein the characteristic of the AC power comprises a frequency of the AC power.

Controlling the characteristic of the AC power may comprise changing the frequency of the AC power generated by the DC-AC inverter relative to a resonant frequency of the resonant main exciter based on a detected change in the DC power received by the DC-AC inverter.

The method may further comprise changing the frequency of the AC power to be closer to the resonant frequency of the resonant main exciter when a reduction in the voltage level of the DC power is detected and/or changing the frequency of the AC power to be further from the resonant frequency of the resonant main exciter when an increase in voltage level of the DC power is detected.

The characteristic of the AC power generated by the DC-AC inverter may further comprise a phase of the AC power relative to a rotation of the rotary transformer. Controlling the characteristic of the AC power may comprise changing the phase of the AC power relative to a rotation of the rotary transformer based on a detected change in the DC power received by the DC-AC inverter.

The method may further comprise controlling a characteristic of the AC power in order to reduce the effect of ripples in the voltage level of the DC power.

The method may further comprise receiving a feedback signal indicative of a generated output voltage of the electric machine when the electric machine is operating as a generator, wherein controlling the characteristic of the AC power generated by the DC-AC inverter is further based at least in part on the feedback signal.

Controlling the characteristic of the AC power may comprise changing the frequency of the AC power generated by the DC-AC inverter relative to a resonant frequency of the resonant main exciter based at least in part on the generated output voltage of the electric machine and a desired generated output voltage of the electric machine.

The method may further comprise changing the frequency of the AC power to be closer to a resonant frequency of the resonant main exciter to increase the generated output voltage of the electric machine and/or changing the frequency of the AC power to be further from the resonant frequency of the resonant rotary transformer to decrease the generated output voltage of the electric machine.

The method may further comprise controlling the characteristic of the AC power in order to achieve a desired generated output voltage of the electric machine when the electric machine is operating as a generator.

The DC-AC inverter may comprise a plurality of switching devices configured to convert the received DC power to AC power, wherein the method further comprises controlling a timing of switching of the plurality of switching devices in order to control the characteristic of the AC power generated by the DC-AC inverter.

In a second aspect of the present disclosure, there is provided a computer program configured to perform the method of the first aspect when executed on one or more processors.

In a third aspect of the present disclosure, there is provided a control unit for controlling a DC-AC inverter of an electric machine, wherein the electric machine comprises a resonant main exciter having a rotary transformer, and wherein the DC-AC inverter is configured to receive DC power, convert the received DC power to AC power, and supply the AC power to the rotary transformer, and wherein the control unit is configured to: monitor a voltage level of the DC power received by the DC-AC inverter; and control a characteristic of the AC power generated by the DC-AC inverter based at least in part on the voltage level of the DC power, wherein the characteristic of the AC power comprises a frequency of the AC power.

In a fourth aspect of the present disclosure, there is provided an electric machine comprising: a resonant main exciter comprising a rotary transformer; a DC-AC inverter is configured to: receive DC power; convert the received DC power to AC power; and supply the AC power to the rotary transformer; and the control unit of the third aspect, wherein the control unit is coupled to the DC-AC inverter and is configured to adjust a gain of the electric machine by controlling a characteristic of the AC power generated by the DC-AC inverter.

In a fifth aspect of the present disclosure, there is provided an aircraft engine comprising the electric machine of the fourth aspect.

In a sixth aspect of the present disclosure, there is provided an aircraft comprising the aircraft engine of the fifth aspect.

In a seventh aspect of the present disclosure, there is provided A control unit for controlling a DC-AC inverter of an electric machine, wherein the electric machine comprises a resonant main exciter having a rotary transformer, and wherein the DC-AC inverter is configured to receive DC power, convert the received DC power to AC power; and supply the AC power to the rotary transformer, and wherein the control unit is configured to: adjust a gain of the electric machine by controlling a characteristic of the AC power generated by the DC-AC inverter, wherein the characteristic of the AC power comprises at least one of a frequency of the AC power and/or a phase of the AC power relative to a rotation of the rotary transformer.

DRAWINGS

Aspects of the present disclosure are described, by way of example only, with reference to the following drawings, in which.

DETAILED DESCRIPTION

The control unit and method of electric machine control disclosed herein is concerned with controlling the frequency of AC power generated by a DC-AC inverter and supplied to the primary winding of a rotatable transformer in a resonant main exciter of an electric machine when operating as a generator. The DC power that is converted to AC power by the DC-AC inverter will typically have fluctuations/variations/ripples as a result of an earlier AC-DC rectification process. The fluctuations/variations/ripples may be superimposed on the AC signal generated by the DC-AC inverter, which in turn can cause fluctuations/variations/ripples in the generated output voltage of the electric machine, negatively affecting the stability of the generated output voltage. One solution to this problem could be to use inductor and capacitor filter components in the DC link between the AC-DC rectifier and the DC-AC inverter. However, these components tend to be large and heavy, which is undesirable in aircraft applications.

The solution presented in this disclosure is to control the frequency of the AC power generated by the DC-AC inverter based on the voltage level of the DC power received by the DC-AC inverter. The resonant main exciter, to which the AC power is supplied, has a resonant frequency and a frequency-gain characteristic where the level of voltage gain of the resonant main exciter (and, by extension, the overall gain of the electric machine) changes with the frequency of the AC signal applied to it. Therefore, detected changes in the DC voltage can be mitigated by controlling changes to the frequency of the AC power to counteract DC fluctuations/variations/ripples. For example, if an increase in DC voltage is detected, the frequency of the AC power may be changed so as to reduce the gain of the resonant main exciter, and vice-versa. As such, the effects of DC voltage fluctuations/variations/ripples may be mitigated by adjusting the frequency of the AC power. A stable generated output voltage of the electric machine may therefore be achieved whilst using smaller inductor and capacitor filter components in the DC link between the AC-DC rectifier and the DC-AC inverter than would otherwise be needed, or potentially without using any inductor and capacitor filter components at all, thereby saving weight.

Furthermore, by utilising the resonance gain effects of a resonant main exciter, the magnitude of the AC power applied to the rotatable transformer may be reduced compared with what would otherwise be required, resulting in lower RF electromagnetic emissions from the electric machine, which may be beneficial for conforming to aviation RF emission limits.

Figure 1:
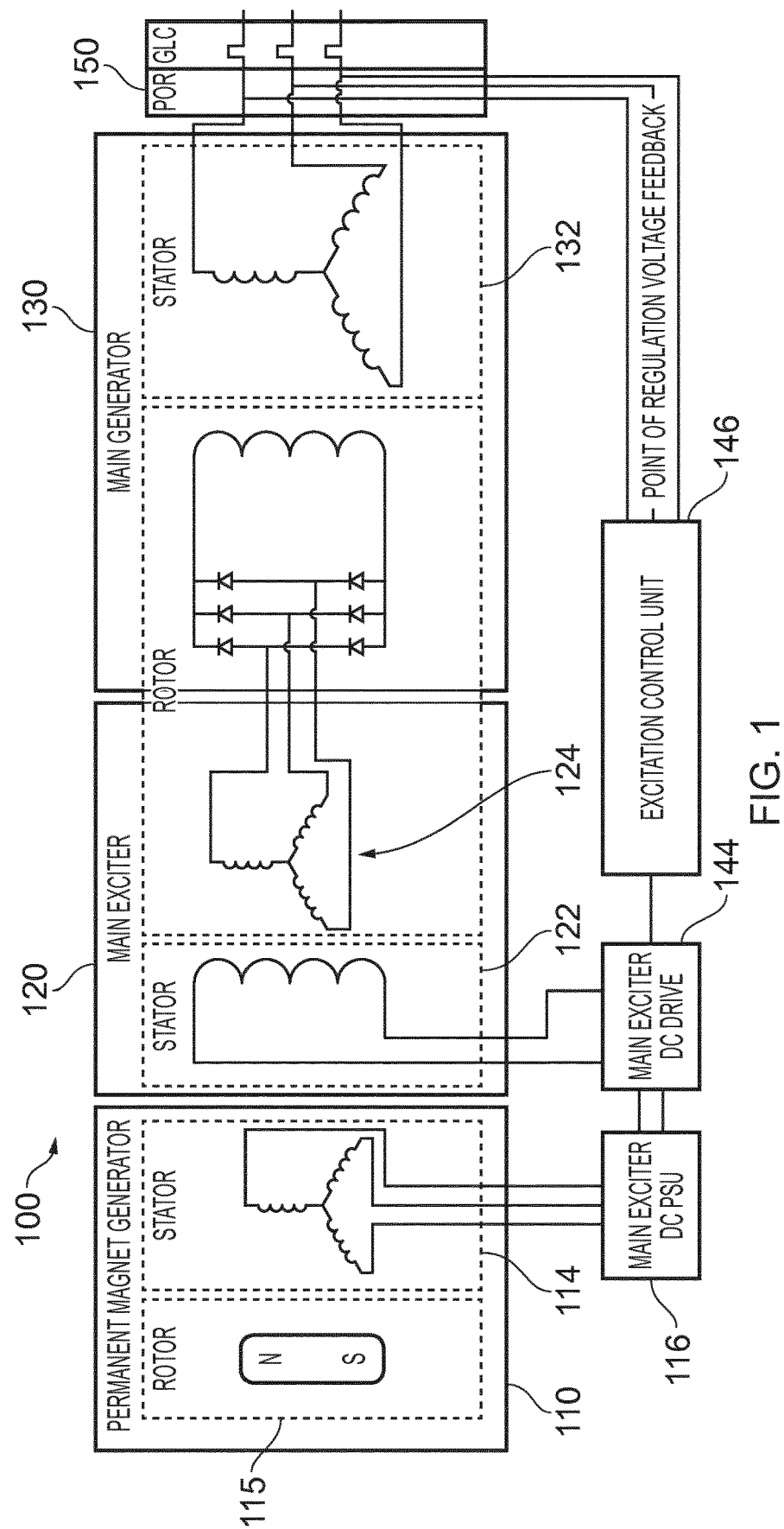
FIG. 1 shows an example schematic representation of a conventional wound field synchronous electric machine.
Figure 2:
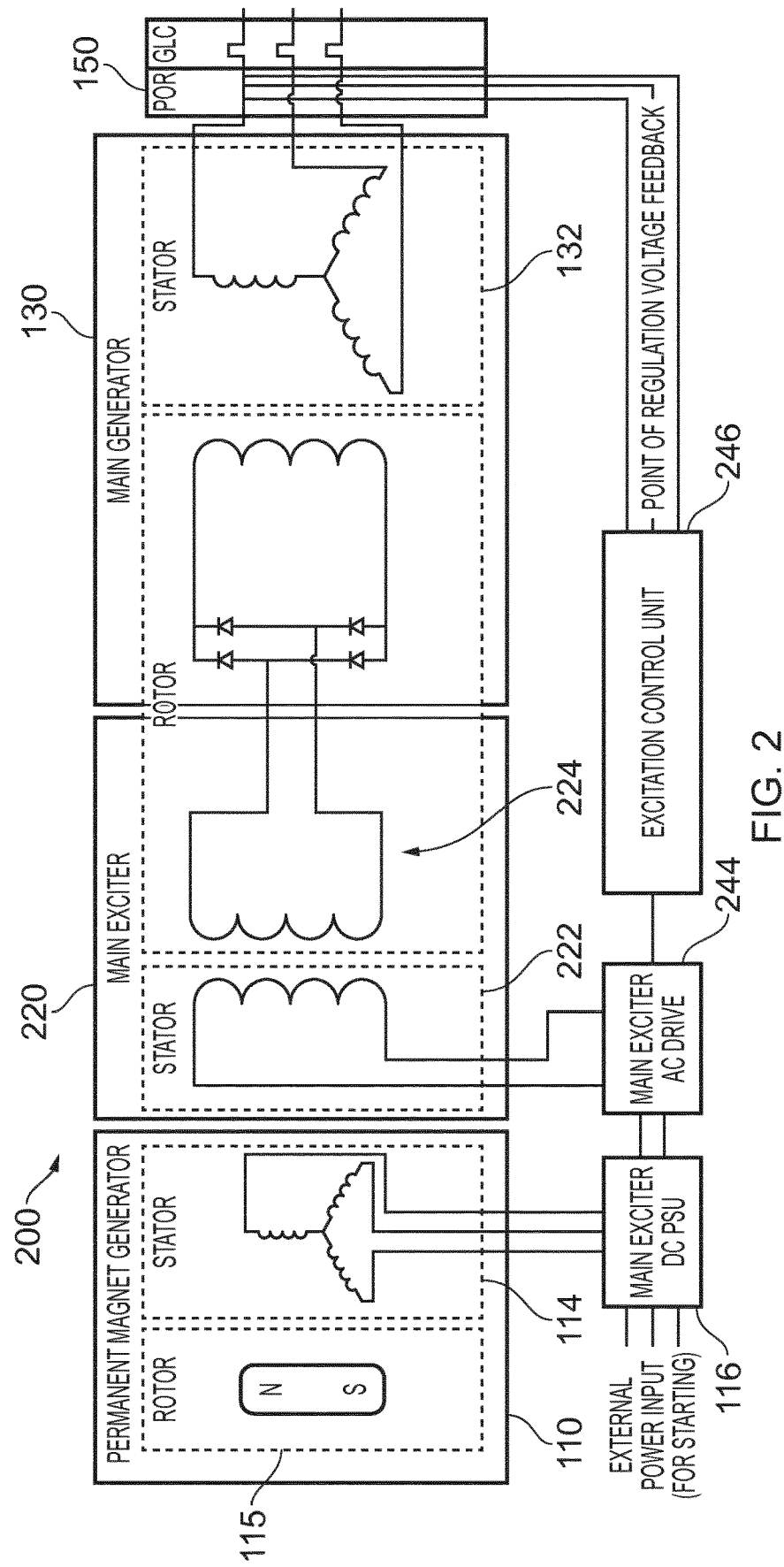
FIG. 2 shows an example schematic representation of an electric machine in accordance with an aspect of the present disclosure.

FIG. 2 shows an example schematic of an electric machine 200 in accordance with an aspect of the present disclosure. The electric machine 200 is similar to the conventional wound field synchronous electric machine 100 represented in FIG. 1 and described in the 'background section', except that the second stage main exciter 120 is replaced with a main exciter 220 comprising a rotary transformer comprising a primary winding 222 and a rotatable secondary winding 224 on the rotor. Furthermore, instead of a main exciter DC drive 144 and excitation control unit 146, there is a main exciter AC drive 244 to provide AC power to the main exciter 220 and an excitation control unit 246 configured to control the main exciter AC drive 244.

The rotary transformer may have consistent operation regardless of the speed of the rotor meaning that the electric machine 200 can be operated as both a starter motor and a generator. However, using a rotary transformer results in a reduction in the mechanical contribution to the power output when the electric machine 200 is operating as an electric generator, compared with the conventional wound field synchronous electric machine 100. This means that the electrical power supplied by the main exciter AC drive 244 to the primary winding 222 may need to be approximately ten times greater than the electrical power supplied by the main exciter DC drive 144 to the stator 122 of the conventional wound field synchronous electric machine 100. The inventors have realised that if this relatively large AC power is provided by a conventional switching convertor in the main exciter AC drive 244, it may be very difficult to conform to the RF emission limits imposed on aircraft electrical systems, which are intended to protect (among other things) radio communications on which safety of aircraft are reliant. A solution to this challenge has been devised by the inventors and uses a resonant mode convertor with low harmonic content.

Figure 3:
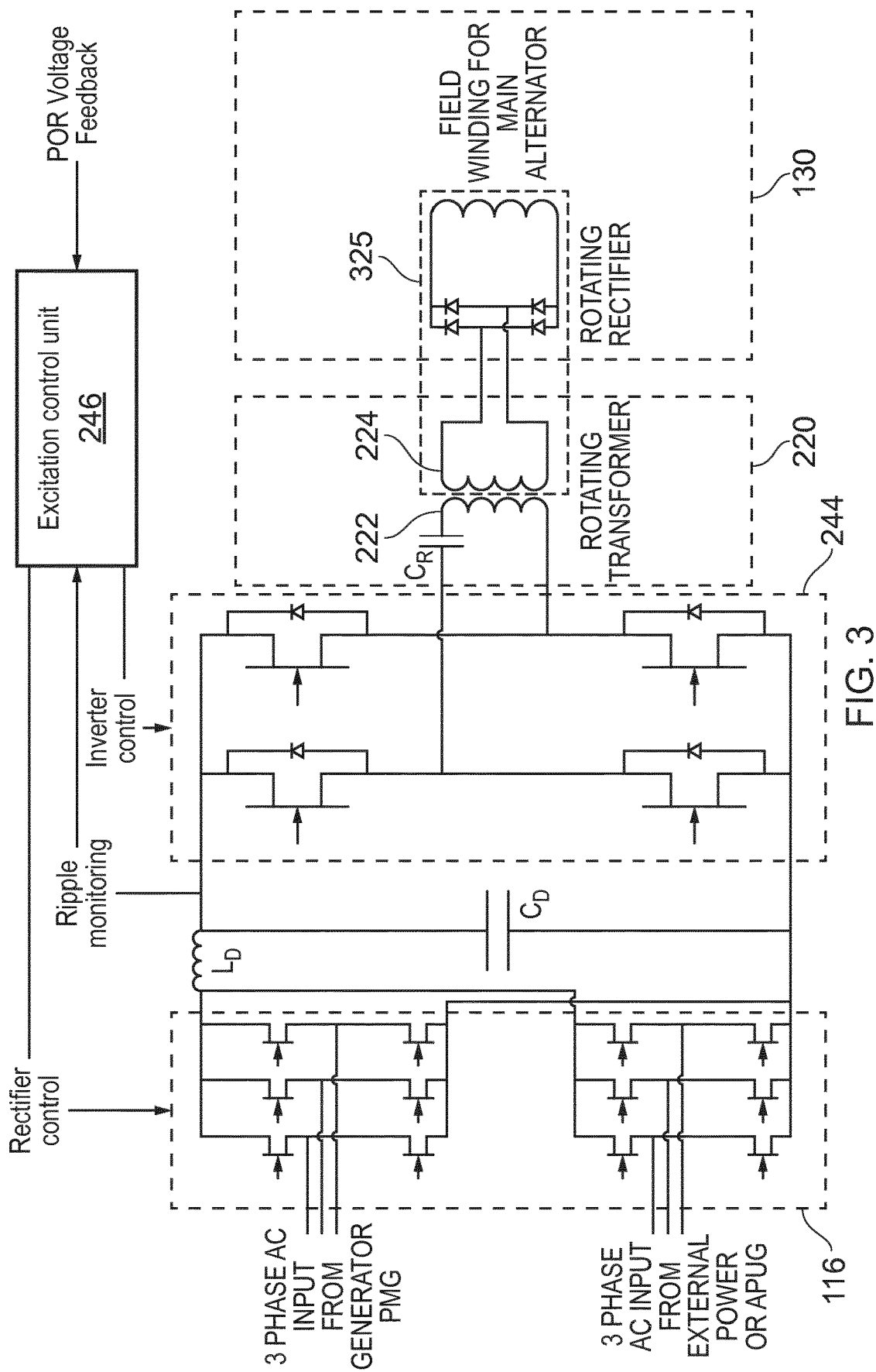
FIG. 3 shows example details of some parts of the electric machine of FIG. 2.

FIG. 3 shows example details of some parts of the electric machine 200 in accordance with an aspect of the present disclosure. As can be seen, in this example implementation, the DC PSU 116 is configured to receive a three phase AC input from the PMG 110 and convert it to a DC output using an active rectifier comprising a plurality of FETs. The PSU 116 is also configured to receive a three phase AC input from an external power source, for example for use when the electric machine 200 is operating as a starter motor.

The main exciter AC drive 244 comprises a plurality of FETs configured in an H bridge inverter arrangement to convert the DC power received via a DC link from the DC PSU 116 to AC power, which is then output to the primary winding 222 of the rotatable transformer of the main exciter 220. The excitation controller unit 246 is configured to control the operation of the inverter, for example by controlling the on/off timing of the FETs in the H-bridge. FIG. 3 also shows a representation of the rotor 325 of the electrical machine 200, which comprises the rotatable secondary winding 224 of the rotatable transformer and a rectifier and the main generator rotor windings.

The main exciter 220 is a resonant main exciter by virtue of a resonant capacitor $C_R$, which forms a resonant circuit with the leakage inductance of the rotatable transformer (although it will be appreciated that the main exciter 220 comprising the rotatable transformer may be made resonant in any other suitable way). The resonant main exciter 220 has a resonant frequency, at which it provides a maximum voltage gain.

The generated voltage output from the main generator 130 to the POR 150 is dependent on the DC current in the rotor field winding of the main generator 130, which in turn is dependent on the current induced in the rotatable secondary winding 224 of the rotatable transformer, which in turn is dependent on the level of the AC power applied to the primary winding 222 of the rotatable transformer, which in turn is dependent on the level of the DC voltage received by the main exciter AC drive 244 via the DC link. When the electric machine 200 is operating as a generator and is rotating at its maximum operating speed, the PMG 110 output voltage will be at its highest, but the excitation requirements on the main exciter 220 in order to generate a desired generated output voltage will be at their lowest. In view of this, in the implementation represented in FIG. 3, the excitation control unit 246 is configured to control the AC-DC rectifier of the DC PSCU 116 in order to control the DC link voltage and, therefore, exercise control over the generated voltage output from the main generator 130 to the POR 150. The excitation control unit 246 may receive a feedback signal indicative of the generated output voltage at the POR 150 and set the DC link voltage accordingly by controlling the AC-DC rectifier of the DC PSU 116.

Figure 4:
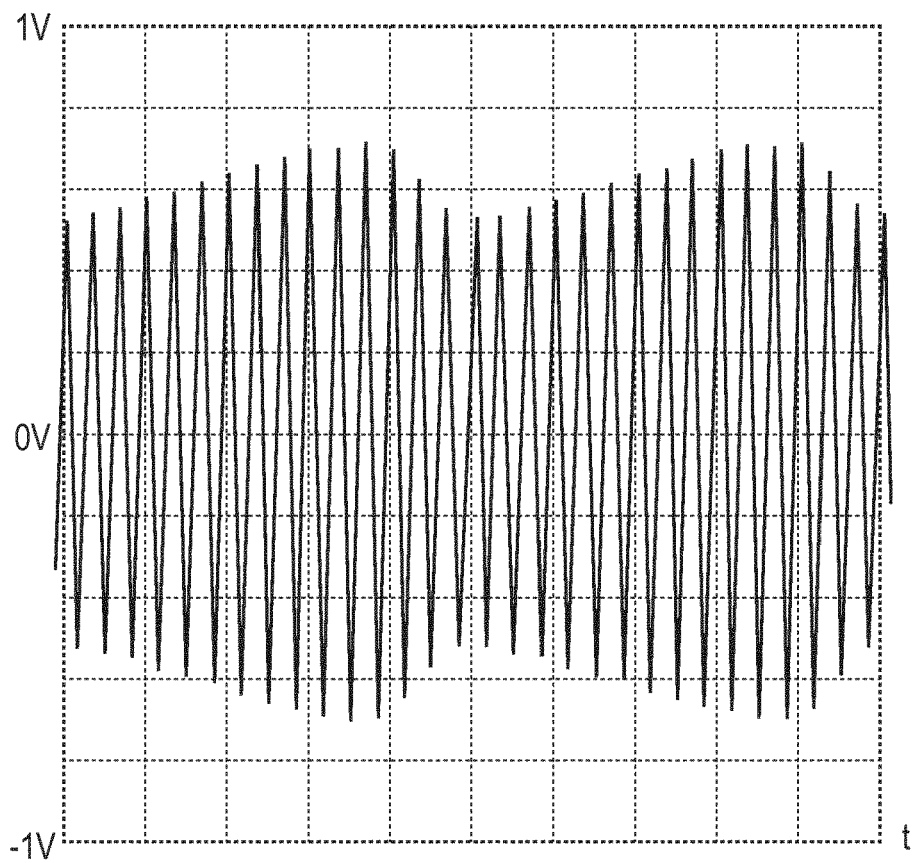
FIG. 4 shows an example representation of an AC signal with superimposed DC ripple.

The skilled person will appreciated that there are typically ripples, or fluctuations, in the DC voltage output from the DC PSU 116 as a result of the operation of the AC-DC rectifier (the DC voltage output from the AC-DC rectifier is unlikely to be a perfectly steady DC signal, as a result of the nature of AC-DC rectification). Ripples in the DC voltage received by the DC-AC inverter will be superimposed on the amplitude of the AC power output to the primary winding 222 from the DC-AC inverter. FIG. 4 shows an example representation of such an AC signal, where low frequency ripples in the DC voltage received at the DC-AC inverter are superimposed on the amplitude of the higher frequency AC signal output from the DC-AC inverter.

These superimposed ripples may in turn result in undesirable ripples in the current induced in the rotor field winding of the main generator 130 and, therefore, also in the generated voltage output from the main generator 130. In view of this, the DC link may comprise a link inductor $L_D$ and a link capacitor $C_D$ to act as a filter to remove the ripples in the DC voltage, thereby improving the stability of the voltage output from the main generator 130 to the POR 150. However, to remove the ripples effectively, the link inductor $L_D$ and link capacitor $C_D$ may need to be large and heavy, which can be a significant issue in aircraft electrical systems where weight and space saving may be important.

Figure 5:
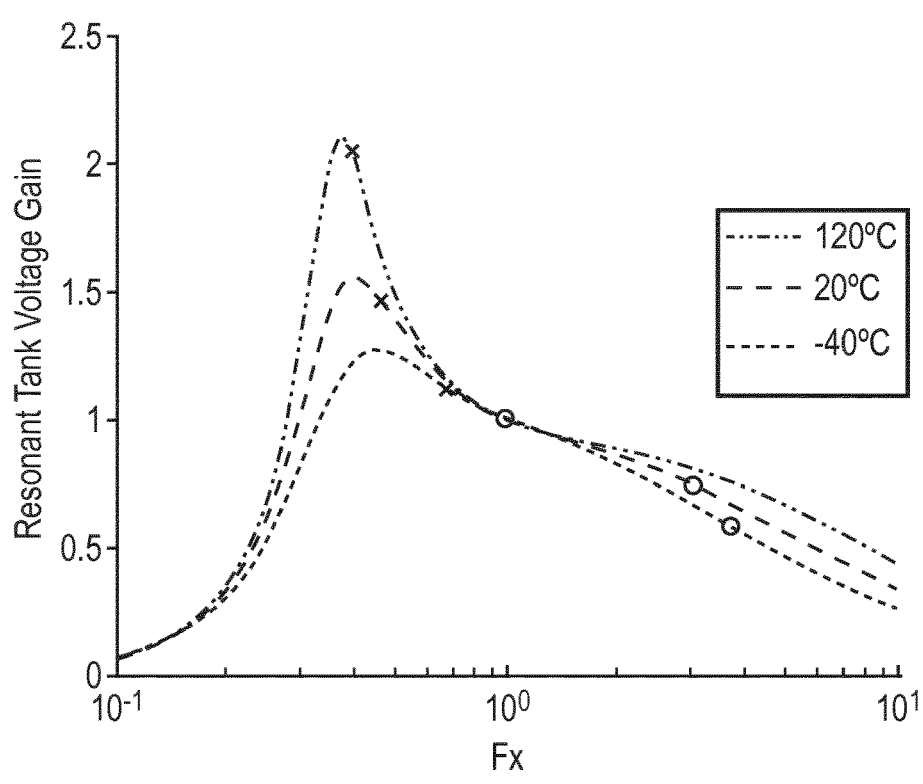
FIG. 5 shows an example representation of the voltage gain characteristics of the resonant main exciter of FIG. 3.

FIG. 5 shows an example representation of the voltage gain characteristics of a resonant main exciter 220 at different temperatures (120° C., 20° C. and −40° C.). The units and scale of voltage gain and frequency represented in the Figure is arbitrary and purely illustrative of an example frequency-gain response of the resonant main exciter 220. It can be seen that the voltage gain of the resonant main exciter 220 varies with frequency of the AC power applied to it by the main exciter AC drive 244. The maximum gain at each temperature corresponds to the resonant frequency of the resonant main exciter 220 at those temperatures. Therefore, if the frequency of the AC voltage generated by the main exciter AC drive 244 is at or near the resonant frequency of the resonant main exciter 220, a degree of voltage gain is provided. This means that a lower AC voltage needs to be applied to the resonant main exciter 220, which should reduce electromagnetic emissions from the electric machine 200 and therefore help in conforming to the RF emission limits imposed on aircraft electrical systems.

The inventors have realised that this resonance characteristic may also be utilised to reduce the size, or remove entirely, the link inductor $L_D$ and link capacitor $C_D$, whilst still reducing or eliminating the effect of ripples in the amplitude of the AC power applied to the primary winding 222, thereby maintaining stability of the generated output voltage of the main generator 130. To this end, the excitation control unit 246 is configured to monitor the voltage level of DC power received at the DC-AC inverter and exercise DC-AC inverter control in order to control the frequency of the AC power generated by the main exciter AC drive 244. By controlling the DC-AC inverter, the frequency of the AC power output from the main exciter AC drive 244 may be varied relative to the resonant frequency of the resonant main exciter 220 based on any detected changes in the DC power received by the DC-AC inverter via the DC link. In so doing, the level of voltage gain of the resonant main exciter 220, and therefore the overall output gain of the electric machine 200, may be continually adjusted to mitigate any changes in the DC voltage caused by DC ripples, such that the DC ripples do not carry through to the generated voltage output from the main generator 130. For example, with reference to FIG. 5, it can be seen that if the frequency of the AC power is moved to be further away from the resonant voltage (for example, increasing the frequency from a value lower than the resonant frequency to a higher value closer to the resonant frequency, or reducing the frequency from a value higher than the resonant frequency to a lower value closer to the resonant frequency), the amount of voltage gain will decrease. Therefore, if a ripple increase in the DC link voltage is detected, the excitation control unit 246 may reduce the gain of the resonant main exciter 220 by controlling the DC-AC inverter to change the frequency of the generated AC power to be further away from the resonant frequency of the resonant main exciter 220. This may counteract the increase in the voltage amplitude of the AC power that is caused by the increase in DC link voltage, thereby mitigating the effects of the DC ripple on the output generated voltage of the main generator 130.

Likewise, if the frequency of the AC power is moved to be closer to the resonant frequency (for example, decreasing the frequency from a value higher than the resonant frequency to a lower value closer to the resonant frequency, or increasing the frequency from a value lower than the resonant frequency to a higher value closer to the resonant frequency), the amount of voltage gain will increase. Therefore, if a ripple decrease in the DC link voltage is detected, the excitation control unit 246 may control the DC-AC inverter to change the frequency of the generated AC power to be closer to the resonant frequency of the resonant main exciter 220. This may counteract the decrease in the voltage amplitude of the AC power caused by the decrease in DC link voltage, thereby mitigating the effects of the DC ripple on the output generated voltage of the main generator 130.

The excitation control unit 246 can respond quickly to detected ripples in the DC link voltage and change the frequency of the generated AC power accordingly. Therefore, it is possible to reduce the size and weight, the link inductor $L_D$ and link capacitor $C_D$, or in some instances eliminate them altogether, whilst still maintaining the stability of the generated output voltage at the POR 150 to within acceptable limits (for example, with no ripple or fluctuation in the generated output voltage, or with ripples/fluctuations that are within acceptable limits).

As can be seen in FIG. 5, the effects of varying temperature over the wide range typically found in aerospace applications may cause the resonant frequency of the resonant main exciter 220 to shift. However, the excitation control unit 246 may be configured to track the resonant frequency with closed loop control using the feedback signal indicative of the generated output voltage. The skilled person will appreciate how such resonance tracking may be implemented and since resonance tracking is not the subject of the present disclosure, details are not disclosed herein for the sake of brevity.

Optionally, the excitation control unit 246 may additionally or alternatively control the frequency of the AC power generated by the DC-AC inverter based on the feedback signal indicative of the generated output voltage of the main generator 130. For example, the frequency of the AC power may be changed relative to the resonant frequency of the resonant main exciter 220 based at least in part on the feedback signal and a desired generated output voltage of the electric machine 200 (for example, a target level of voltage for the electric machine 200 to generate). The frequency of the AC power may be changed to be closer to the resonant frequency of the resonant main exciter 220 to increase the generated output voltage of the electric machine 200 and/or may be changed to be further from the resonant frequency of the resonant main exciter 220 to decrease the generated output voltage of the electric machine 200. Consequently, a passive AC-DC rectifier may optionally be used for the DC PSU 116, with feedback control of the output generated voltage at the POR 150 being controlled by controlling the frequency of the AC power and therefore the amount of gain in the resonant main exciter 220. This may reduce complexity, cost and/or weight of the DC PSU 116. Alternatively, an active AC-DC rectifier may still be used, with the excitation control unit 246 exercising control over the DC-AC rectifier and the AC-DC inverter to set the DC link voltage and the frequency of AC power applied to the primary winding 222 in order to achieve a stable generated output voltage of the main generator 130 at a desired voltage level.

Furthermore, it should be noted that when the electric machine 200 is operating as a generator, the output voltage of the PMG 110 may vary with the speed of rotation of the rotor, potentially over a range of 2:1, or even greater. It may be desirable, therefore, to use a half-wave rectifier (either passive or active) in order to limit the range of DC link voltage variation. This is likely to increase the size of DC ripples in the DC link voltage, which would previously have required larger filter components $L_D$ and $C_D$. However, by controlling the frequency of the AC power output from the DC-AC inverter as described above, it may be possible to use a half-wave rectifier and benefit from the consequent low DC link voltage variation, without requiring overly large and heavy filter components $L_D$ and $C_D$.

Optionally, the excitation control unit 246 may also control the DC-AC inverter to control the phase of the AC power applied to the primary winding 222 relative to a rotation of the rotary transformer. In more detail, when the electric machine 200 is operating as a generator, the secondary winding 224 of the rotary transformer will be rotating at a particular frequency relative to the primary transformer 222 (i.e., at the frequency of rotation of the rotor of the electric machine 200). The phase of the AC power applied to the primary winding 222 of the resonant main exciter 220 relative to the frequency of rotation of the rotary transformer may affect the amount of current induced in the secondary winding 224 and therefore the level of generator output voltage at the POR 150. Consequently, changing the phase of the AC power applied to the resonant main exciter 220 relative to the frequency of rotation of the secondary winding 224 may change the gain of the electric machine and, therefore, can be used to mitigate the effect of ripples in the DC link voltage and/or control the generated output voltage in order to achieve a desired output voltage.

Figure 6:
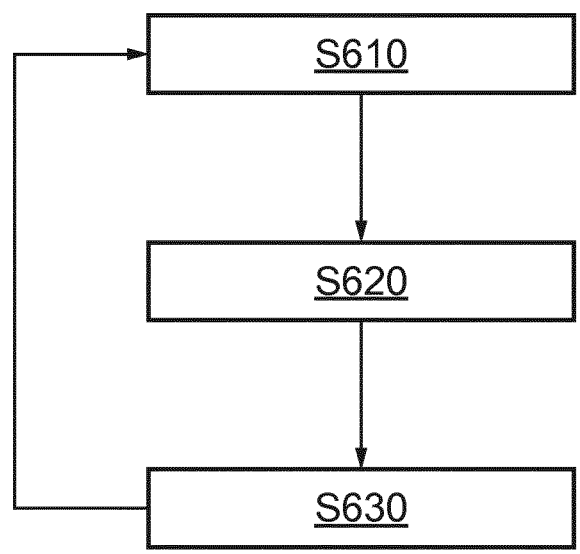
FIG. 6 shows an example representation of a control process in accordance with the present disclosure.

FIG. 6 shows an example representation of a control process which may be performed in accordance with an aspect of the present disclosure, for example by the excitation control unit 246.

In Step S610, the voltage level of DC power received at the DC-AC inverter of the main exciter AC drive 244 is determined, for example as part of the excitation control unit 246 monitoring the DC link voltage. This voltage determination may be performed in any suitable way that would be well understood by the skilled person, for example by using a voltmeter.

In Step S620, the generated output voltage of the electric machine 200 (for example, the voltage at the POR 150) is optionally determined, for example by the excitation control unit 246 receiving the POR feedback signal.

In Step S630, the frequency (and optionally also the phase) of the AC power generated by the DC-AC inverter of the main exciter AC drive 244 is controlled based at least in part on the DC link voltage (and optionally based also on the generated output voltage of the electric machine 200). By controlling the frequency of the AC power based on the DC link voltage, ripples in the DC link voltage may be mitigated by changing the frequency of the AC power relative to a resonant frequency of the resonant main exciter 220. Consequently, the weight of the electric machine 200 may be reduced by reducing the size of, or eliminating altogether, the link inductor $L_D$ and link capacitor $C_D$.

The process then returns to Step S610 and the loop may be continually repeated, such that the DC voltage is continuously monitored and changes made to the frequency of the AC power as appropriate.

Figure 7:
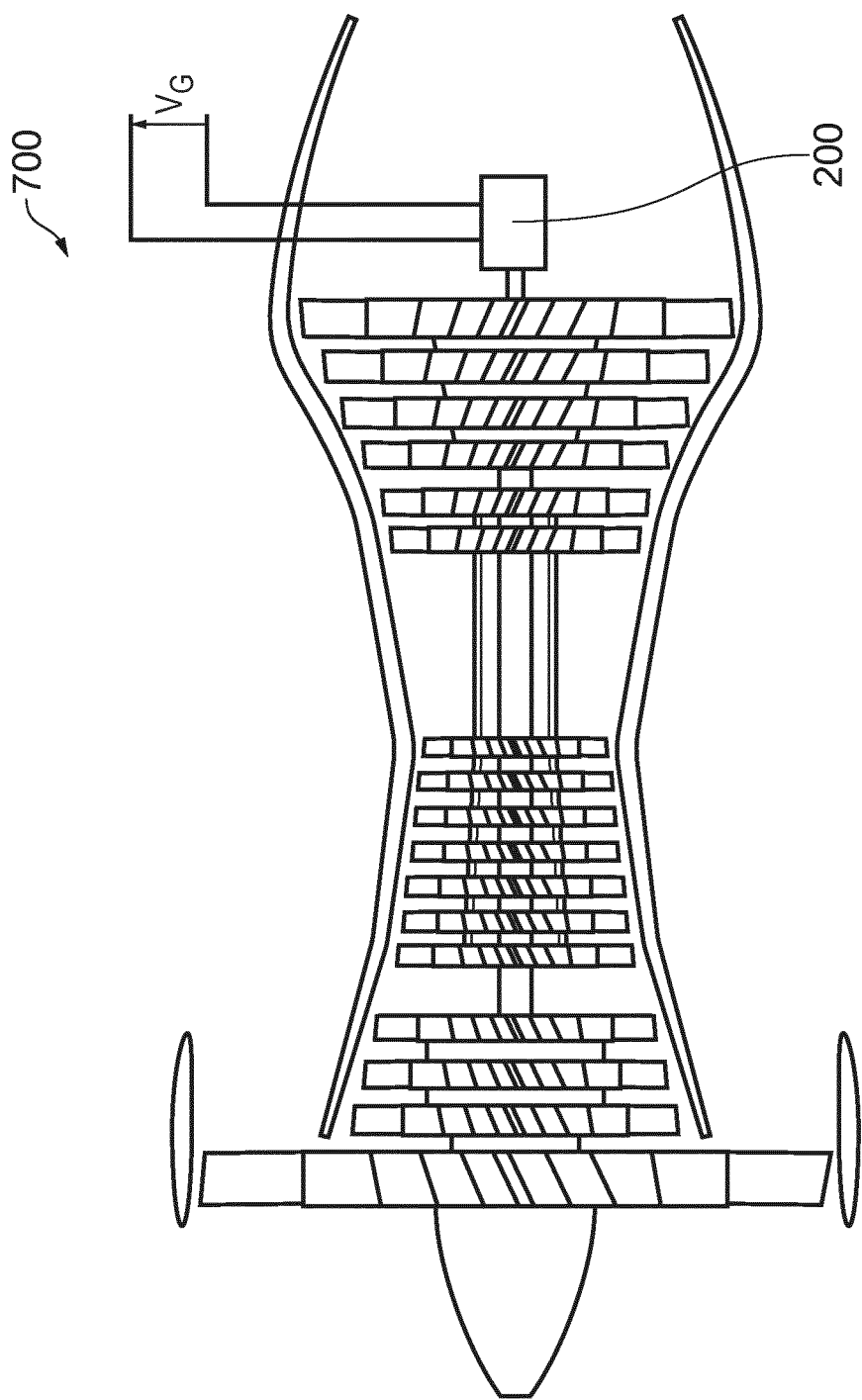
FIG. 7 shows an example schematic representation of an aircraft jet engine comprising the electric machine of FIG. 2.

FIG. 7 shows an example schematic representation of an aircraft jet engine 700 comprising the electric machine 200 of the present disclosure. As can be seen, the electric machine 200 is coupled to a shaft of the jet engine 700 and may be operated as a generator and/or starter motor. The electric machine 200 outputs a generated voltage, $V_G$, when operating as a generator.

Figure 8:
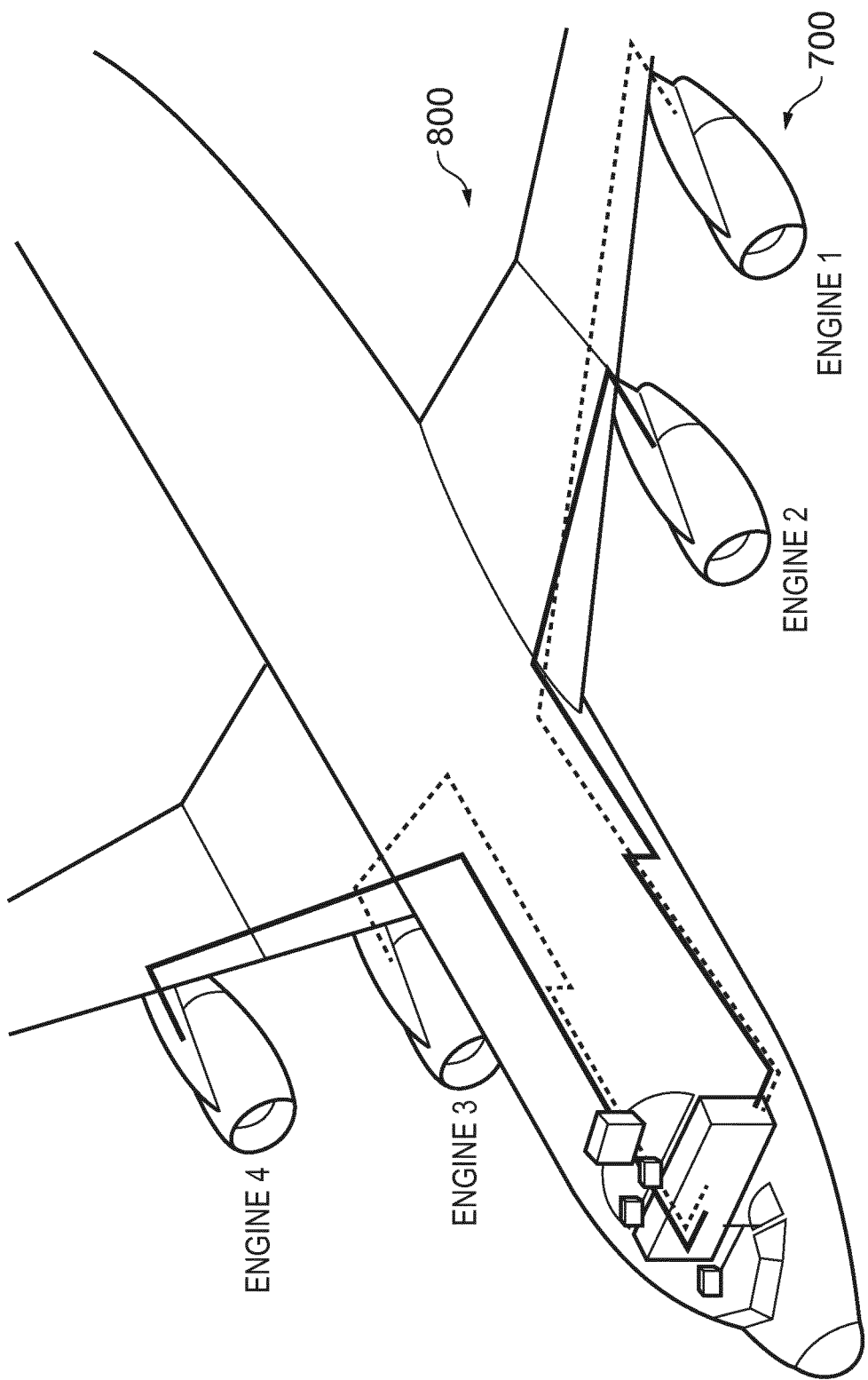
FIG. 8 shows an example schematic representation of an aircraft comprising the aircraft jet engine of FIG. 7.

FIG. 8 shows an example schematic representation of an aircraft comprising the aircraft jet engine 700 of FIG. 7.

The skilled person will readily appreciate that various alterations or modifications may be made to the above described aspects of the disclosure without departing from the scope of the disclosure.

For example, in the configuration represented in FIG. 3 and described above, three phase power is generated by the PMG 110 and rectified by the DC PSU 116. In an alternative, the PMG 110 may generate power in any number of phases, for example single phase, or multi-phase (for example, two phase, three phase, four phase, etc).

The DC PSU 116 may not also be configured to receive and rectify external AC power for starting the electric machine when operating as a motor. This functionality may instead be handled by any other suitable modules/components (for example, the external power for use during starting of the electric machine 200 as a motor may come from a battery in the form of DC power, in which case AC-DC rectification of starter motor power would not be required).

The DC PSU 116 may comprise any type of AC-DC rectifier, for example active or passive, full-wave or half-wave, using any suitable active or passive components, such as diodes, thyristors, FETs (such as MOSFETs, MESFETs, IGBTs, JFETs, etc), bipolar transistors, etc. Likewise, the DC-AC inverter of the main exciter AC drive 244 may be of any suitable configuration and use any suitable components, for example switching devices such as thyristors, FETs (such as MOSFETs, MESFETs, IGBTs, JFETs, etc), bipolar transistors, etc, to enable the excitation control unit 246 to control the frequency of the generated AC power.

FIG. 5 shows merely one, non-limiting, example representation of the frequency response of the resonant main exciter 220. It will be appreciated that the frequency response characteristics of the resonant main exciter 220 may be different to those represented, for example depending on the size and configuration of the rotatable transformer and the resonant capacitor $C_R$.

In FIG. 3, the excitation control unit 246 is represented as controlling both the DC-AC inverter and the AC-DC rectifier. However, in an alternative it may control only the DC-AC inverter, and control of the AC-DC rectifier may be performed by a different unit/module and/or a passive AC-DC rectifier may be used.

The functionality of the excitation control unit 246 may be implemented by software, hardware or a combination of software and hardware. For example, it may be implemented in programmable logic or fixed hardware components. Alternatively, its functionality may be implemented by software comprising computer readable code, which when executed on one or more processors, performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The excitation control unit 246 may form a stand-alone hardware or software unit, or may be part of a larger module/unit, for example it may be one particular function within an overall electric machine controller.

The invention claimed is:

1. A method of controlling a DC-AC inverter of an electric machine, wherein the electric machine comprises a resonant main exciter having a rotary transformer, the method comprising:
monitoring a voltage level of DC power received at the DC-AC inverter; and
controlling a characteristic of AC power generated by the DC-AC inverter and supplied to the rotary transformer, wherein controlling the characteristic of the AC power is based at least in part on the voltage level of the DC power, wherein the characteristic of the AC power comprises a frequency of the AC power.

2. The method of claim 1, wherein controlling the characteristic of the AC power comprises changing the frequency of the AC power generated by the DC-AC inverter relative to a resonant frequency of the resonant main exciter based on a detected change in the DC power received by the DC-AC inverter.

3. The method of claim 1, further comprising:
changing the frequency of the AC power to be closer to the resonant frequency of the resonant main exciter when a reduction in the voltage level of the DC power is detected; and/or
changing the frequency of the AC power to be further from the resonant frequency of the resonant main exciter when an increase in voltage level of the DC power is detected.

4. The method of claim 1, wherein the characteristic of the AC power generated by the DC-AC inverter further comprises a phase of the AC power relative to a rotation of the rotary transformer.

5. The method of claim 4, wherein controlling the characteristic of the AC power comprises changing the phase of the AC power relative to the rotation of the rotary transformer based on a detected change in the DC power received by the DC-AC inverter.

6. The method of claim 1, further comprising controlling a characteristic of the AC power in order to reduce ripples in the amplitude of the AC power.

7. The method of claim 1, further comprising:
receiving a feedback signal indicative of a generated output voltage of the electric machine when the electric machine is operating as a generator; wherein
controlling the characteristic of the AC power generated by the DC-AC inverter is further based at least in part on the feedback signal.

8. The method of claim 7, wherein controlling the characteristic of the AC power comprises changing the frequency of the AC power generated by the DC-AC inverter relative to a resonant frequency of the resonant main exciter based at least in part on the generated output voltage of the electric machine and a desired generated output voltage of the electric machine.

9. The method of claim 7, further comprising:
changing the frequency of the AC power to be closer to a resonant frequency of the resonant main exciter to increase the generated output voltage of the electric machine; and/or changing the frequency of the AC power to be further from the resonant frequency of the rotary transformer to decrease the generated output voltage of the electric machine.

10. The method of claim 7, further comprising controlling the characteristic of the AC power in order to achieve a desired generated output voltage of the electric machine when the electric machine is operating as the generator.

11. The method of claim 1, wherein the DC-AC inverter comprises a plurality of switching devices configured to convert the received DC power to AC power, the method further comprising:
controlling a timing of switching of the plurality of switching devices in order to control the characteristic of the AC power generated by the DC-AC inverter.

12. A computer program configured to perform the method of claim 1 when executed on one or more processors.

13. A control unit for controlling a DC-AC inverter of an electric machine, wherein the electric machine comprises a resonant main exciter having a rotary transformer, and wherein the DC-AC inverter is configured to receive DC power, convert the received DC power to AC power, and supply the AC power to the rotary transformer, and wherein the control unit is configured to:
monitor a voltage level of the DC power received by the DC-AC inverter; and
control a characteristic of the AC power generated by the DC-AC inverter based at least in part on the voltage level of the DC power, wherein the characteristic of the AC power comprises a frequency of the AC power.

14. An electric machine comprising:
a resonant main exciter comprising a rotary transformer;
a DC-AC inverter configured to:
receive DC power;
convert the received DC power to AC power; and
supply the AC power to the rotary transformer; and
a control unit for controlling the DC-AC inverter, wherein the control unit is configured to:
monitor a voltage level of the DC power received by the DC-AC inverter; and
control a characteristic of the AC power generated by the DC-AC inverter based at least in part on the voltage level of the DC power, wherein the characteristic of the AC power comprises a frequency of the AC power, and wherein the control unit is coupled to the DC-AC inverter and is configured to adjust a gain of the electric machine by controlling a characteristic of the AC power generated by the DC-AC inverter.

15. An aircraft engine comprising the electric machine of claim 14.

16. An aircraft comprising the aircraft engine of claim 15.

* * * * *